United States Patent Office 3,423,318
Patented Jan. 21, 1969

3,423,318
ORGANOPOLYSILOXANE GREASE
Ignaz Bauer, Siegfried Nitzshe, and Rudolf Riedle, Burghausen, Upper Bavaria, Germany, assignors to Wacker-Chemie G.m.b.H., Munich, Bavaria, Germany
No Drawing. Filed May 16, 1967, Ser. No. 638,766
Claims priority, application Germany, May 17, 1966, W 41,598
U.S. Cl. 252—49.6   7 Claims
Int. Cl. C10m 7/50

ABSTRACT OF THE DISCLOSURE

The use of certain diurea compounds as thickening agents in polysiloxane oils to form greases exhibiting excellent lubricant and temperature stability properties is described.

BACKGROUND OF THE INVENTION

It has long been known that organopolysiloxane oils are excellent basic oils for preparing high and low temperature lubricants. Their excellent viscosity-temperature performance makes these oils useful even at extremely low temperatures because their solidification point is lower than the temperature of Dry Ice and the compounds which are prepared therefrom exhibit a soft, fatty consistency even at −70° C. On the other hand, the organopolysiloxane oils are among the most heat-stable fluids and can be heated to temperatures of 250 to 300° C. without decomposing. In comparison with other lubricating oils, their viscosity, also, is subject to less reduction with increasing temperature, i.e. the viscosity temperature slope of these fluids is relatively flat.

The exploitation of these excellent properties has been attempted for many years in the preparation of suitable high- and low-temperature lubricating materials. It is known that useful lubricants can be prepared by thickening organopolysiloxane oils with lithium soaps of long chain fatty acids. Such compounds based on lithium soap/organopolysiloxane oil have proven to be excellent in practice but they do have the disadvantage that they can only be used up to a maximum temperature of 180° C. and that they are easily decomposed by acids and alkalis. At a temperature above 180° C., the carbon radical of the fatty acid is oxidized by atmospheric oxygen, the compound becomes black, thickens and carbonizes. Furthermore, the melting point of the lithium soap is about 210° C. so that such compounds will melt and become fluid even when heated only briefly to more than 200° C. The decomposition of the lithium soap is irreversible, hence the grease becomes useless after this temperature range has been exceeded just one time.

In order to circumvent these difficulties, a wide variety of other thickeners for organopolysiloxane oils has been suggested. However, from this great number of potentially temperature-stable compounds only a few could be used because it was found that organopolysiloxane oils can be thickened to form a grease-like substance which retains its lubricating and grease-like properties at high and low temperatures only with great difficulty.

Very good lubrication values were obtained with phthalocyanines as the thickening agent but phthalocyanines are very intense dyes, hence working with such phthalocyanine compounds is very uncomfortable. The blue to green color tone of the phthalocyanines which are suitable for preparing greases is extremely difficult to remove from machine parts, surfaces, and the hands of the service personnel. In spite of the good application-technical properties, therefore, the use of intensely colored phthalocyanineorganopolysiloxane compounds has not been widely commercialized.

The use of inorganic thickeners such as manufactured silicas, certain processed active clays and montmorillonite products, has not proven to be a satisfactory solution. While organic lubricating oils containing these products will give good stable compounds, organopolysiloxane oils thickened to greases with such products tend to soften at high temperatures or high shear stress. This phenomenon goes so far that compounds from inorganic thickeners and organopolysiloxane oils will flow like high viscosity fluids and show no fatty structure at all after a period of time. The lubricity of the compounds which are obtainable by using inorganic thickeners also is very nominal.

It has also been suggested that polymeric arylureas with various substituents, or mixtures of various arylureas might be used as thickeners. These products show the disadvantage that a reciprocal reduction of the melting point will occur due to the various substituents and/or the various types of ureas employed. Even thought the individual types of ureas which are used here melt at very high temperatures, they still lower their own mixed melting point so strongly that their use appears logical with organic oils but the excellent heat stability of the organopolysiloxane oils cannot be exploited.

Another suggestion includes the use of substituted acid amides and polyureas prepared from diamides and diisocyanates as thickeners. Depending on the method of preparation, these products contain free amino or isocyanate groups. These groups, however, are very sensitive to atmospheric moisture and atmospheric oxygen so that the compounds which are prepared from them cannot be used at tempreatures above 200° C.

Furthermore, organosiloxane oils thickened to grease consistency with high melting aromatic ureas, aromatic diureas, acid amides and diamides are known. Greases prepared from organopolysiloxane oils with these materials as thickeners can withstand temperatures above 200° C. The nitrogen compounds proposed must be prepared from aromatic mono- or diamines such as aniline, naphthylamine, benzidine and the like. It is known that these compounds are physiologically active and great care must be practiced in handling them, e.g. aniline. A decomposition of the acid amides by moisture or atmospheric oxygen will again leave the original aromatic amines. Furthermore, it has been found that these highly aromatic ureas and diureas are very difficult to process during the preparation of the greases because they tend to form greasy precitates which are difficult to work with.

The subject of the present discovery is a grease-like lubricant comprising a mixture of at least one organopolysiloxane oil and at least one diurea of the general formula   R—NH—CO—NH—R'—NH—CO—NH—R wherein each R is a cycloalkyl radical of 4–18 carbon atoms and each R' is a divalent radical selected from aliphatic and aromatic hydrocarbon radicals.

The diurea compounds employed herein can be prepared by simple, known reactions at commercially attractive cost. They give excellent lubricants avoiding or minimizing the many difficulties heretofore encountered with silicone oil base greases. When combined with organopolysiloxane oil, the diureas are physiologically innocuous, Methods for preparing the diureas employed herein are known in the art. The preferred method of preparation is the reaction of a diisocyanate with a cycloalkylamine expediently employing a small excess of the amine. The diurea which is formed is easy to handle and to process. The excess amine reactant as well as other contaminants can easily be removed from the reaction product by washing.

In the structural formula defining the diureas employed herein, each R is a monovalent cycloalkyl radical containing 4–18, preferably 4–12, carbon atoms such as cyclohexyl, cyclopropyl, and cyclododecyl radicals. The cycloalkyl radicals represented by R can be substituted with monovalent alkyl radicals or other physiologically innocuous radicals as in ethylcyclohexyl and propylcyclononyl radicals.

The radicals represented by R' in the structural formula defining the diureas employed herein are divalent radicals generally present in the commercial and known diisocyanates. R' can be a divalent alkylene radical such as methylene, propylene, hexamethylene and arylalkylene and alkylalkylene radicals such as

—$CH_2CH_2CH(CH_3)CH_2CH_2CH_2$—

—$CH_2CH_2C(C_2H_5)_2CH_2CH_2CH_2$—

—$CH_2CH_2CH(C_6H_5)CH_2CH_2$—

—$CH_2$—$CH(CH_3)$—$CH(C_6H_5)CH_2CH(CH_3)CH_2$— and —$C_aH_{2a}$— where $a$ is 1–18. R' can also be toluylene, 4,4'-diphenylmethylene, naphthylene, alkyl substituted naphthylenes, phenylene and similar arylene radicals. The R' should, however, be such that the diurea prepared therefrom remains stable at temperatures up to at least 300° C.

A second method for preparing the diureas employed herein is to react a cycloalkylisocyanate such as cyclohexylisocyanate with the corresponding diamine. With a suitable choice of starting materials, chemically identical diureas can be obtained.

The preferred R radicals are unsubstituted cyclohexyl radicals as well as their substituted derivatives, insofar as they are physiologically innocuous under the conditions of preparation and later processing. The diisocyanate used can have a cycloaliphatic or aromatic basis. The preferred compounds are cyclohexyl aminediisocyanates, substituted in various places, diphenylmethane-4,4'-diisocyanate, the various toluylene and naphthylene diisocyanates and hexamethylene 1,6-diisocyanate.

The most preferred diurea is the one which is obtained by reacting two molecules of cyclohexylamine with one molecule of naphthylenediisocyanate.

In contrast to lubricants using the known polymeric and unsymmetrical ureas and acid amides as additives, a lubricant of the present discovery has a higher drop point, greater heat stability and improved lubricating properties. Unexpectedly, a lubricant prepared according to the present discovery when compared with control compounds of the same organopolysiloxane oil but other types of ureas showed much less bleeding of the oil, less hardening at high temperatures, less softening from higher shear stress and vigorous kneading thus inducing a greatly lengthened life in motors in continuous operation.

The organopolysiloxane oils which can be used are all the oils which have heretofore been used for the preparation of lubricants especially organopolysiloxanes in which the ratio of SiC-bonded organic radicals to silicon is in the range from 1.80:1 to 2.20:1, preferably 1.90:1 to 2.10:1, and which contain 0 to 15 mol percent units of the formula $R''SiO_{3/2}$, 1 to 20 mol percent units of the formula $R''_3SiO_{1/2}$, wherein $R''$ is a monovalent hydrocarbon radical or monovalent halogenated hydrocarbon radical, and the remaining units are of the formula $R''_2SiO$. The $R''$ radicals can be alkyl radicals such as methyl, ethyl, and octadecyl radicals; aryl radicals such as phenyl, naphthyl, biphenyl and anthracyl radicals; aralkyl radicals such as benzyl and phenylethyl radicals; alkaryl radicals such as tolyl and xylyl radicals; cycloaliphatic radicals such as cyclohexyl and cyclopentyl radicals; alkenyl radicals such as vinyl and allyl radicals, phenoxy phenyl radicals or halogenated monovalent hydrocarbon radicals such as chloromethyl, trifluoromethyl, bromoethyl, chloroiodooctyl, dichlorophenyl, trichloroanthracyl, fluorochlorotolyl, bromobenzyl, trichlorophenyl, polychlorobiphenyl, and trichlorovinyl radicals. The preferred radicals are methyl, ethyl, phenyl, halogenphenyl, or halogenmethyl radicals and especially the chlorinated radicals. The radicals represented by $R''$ can contain 1–18 carbon atoms.

The organopolysiloxane consists principally of a diorganosiloxane. At least 55 mol percent and preferably 70 to 90 mol percent of the siloxane units are diorganosiloxane units of the formula $R''_2SiO$.

The organopolysiloxanes can have viscosities of 5 cs. at 25° C. to 10,000 cs. at 25° C. and higher. The amount of thickener employed depends on the viscosity of the polymer as well as on the application which is intended. In general the quantity of thickener amounts to 10 to 50 percent by weight, preferably 20 to 40 percent by weight, calculated on the total weight of the lubricant.

The ureas can be mixed with the organopolysiloxane oils according to universally known methods. Thus, it is possible to prepare the thickener in a separate process and to combine the dry pulverulent product with organopolysiloxane oil. The urea, however, can also be combined in a solvent-moist condition with the organopolysiloxane oil, after its preparation, and the solvent can be removed from the compound later in another stage. The preparation of the required diureas is also possible in the presence of the organopolysiloxane oil with and without solvent.

In addition to the thickeners of the present discovery, other common additives can also be used. Laminar materials such as graphite and molybdenum sulfide can be used in small quantities of up to a maximum of 10 percent by weight, calculated on the totol weight of the lubricant, to improve the lubricant properties.

With the exception of the first method named, it is necessary to remove the residual solvent from the finished compound by heating to an elevated temperature and possibly by applying vacuum in all long-familiar methods of preparation.

Example 1

315 g. naphthylene-1,5-diisocyanate was dissolved in 3 liters of perchloroethylene at 70° C. A solution of 315 g. cyclohexylamine and 1 liter perchloroethylene was allowed to run into the solution slowly and with concurrent stirring. After the reaction product had been stirred for two hours at 70° C. the urea formed was filtered off employing a suction filter. The product was washed clean with more solvent and was dried at 100 to 120° C.

The dry urea was pulverized and mixed with 3,100 g. of a trimethylsilyl endblocked phenylmethylpolysiloxane having a viscosity of 400 cs. and a refractive index of 1.505 measured at 25° C. After processing several times on a three-roll mill, a homogeneous grease having the following properties was obtained:

Stationary penetration, 250 (according to DIN 51804).
Penetration after 60,000 up and down strokes, 275 (according to DIN 51804).
"Weld load" in a four-roll apparatus, 230/250 kg. (according to DIN 53654).
Dropping point, higher than 320° C.

If a compound is prepared under the same conditions using an equimolar quantity of naphthylamine in place of cyclohexylamine, a much less stable compound will be obtained with the following properties:

Stationary penetration, 220.
Penetration after 60,000 up and down strokes, 350.
"Weld load" in a four-roll apparatus, 120/140 kg.
Dropping point, higher than 320° C.

Example 2

500 cc. of acetone and 50 g. of cyclohexylamine (0.5 mol) were placed in a 2-liter flask equipped with stirrer, reflux cooler and dropping funnel. 62.5 g. (0.25 mol) of commercially pure diphenylmethane - 4,4' - diisocyanate was added dropwise while stirring.

This increases the temperature from 21° to 49° C. The principal portion of the acetone was distilled from the precipitated diurea and the slurried residue is mixed with 235 g. of a trimethylsilyl endblocked chlorophenylmethylpoly siloxane having a viscosity of 200 cs. and a refractive index of 1.455 measured at 25° C.

The product was processed on a three-roll mill until it was homogeneous and the residual acetone was driven off in a dry chest at 150° C. A grease with the following properties was obtained:

Stationary penetration, 280.
Penetration increases after 60,000 up and down strokes, 28.
Dropping point, more than 320° C.
Bleeding after 24 hours at 150° C., 1.2%.
Maximum pressing pressurse in the Almen-Wieland testing machine, 350 kg.

If the same compound is prepared according to the same method, with an equimolar quantity of aniline, a compound with the following properties will be obtained:

Stationary penetration, 270.
Penetration increases after 60,000 up and down strokes, 72.
Dropping point, 270° C.
Bleeding after 24 hours at 150° C., 4.1%.
Maximum pressing pressure in the Almen-Wieland testing machine, 250 kg.

Example 3

Equivalent results were achieved when Example 1 was repeated employing a chemically equivalent amount of any of the following commercially available diisocyanates in place of the naphthylene-1,5-diisocyanate employed therein: bitolylene diisocyanate, dianisidine diisocyanate, diphenylxenylene diisocyanate, xenylene diisocyanate, dichloroxenylene diisocyanate, polymethylene polyphenylisocyanate, tolylene diisocyanate and hexamethylene diisocyanate.

Example 4

Equivalent results were achieved when Example 2 was repeated employing a chemically equivalent amount of any of the following amines in place of the cyclohexyl amine: cyclopentyl amine, ethylcyclohexyl amine, cyclononyl amine, ethylcyclododecyl amine and cyclooctyl amine.

Example 5

Equivalent results were achieved when Example 1 was repeated employing as the polysiloxane fluid any of the following: dimethylsiloxane polymer of the average formula $(CH_3)_3SiO[(CH_3)_2SiO]_xSi(CH_3)_2$ where $x$ has a value from 100 to 1000; a copolymer having a viscosity of 1000 cs. at 25° C. comprising 50 mol percent $(CH_3)_2SiO$ units, 30 mol percent dichlorophenylmethylsiloxane units and 20 mol percent $CF_3CH_2CH_2(CH_3)SiO$ units with $(CH_3)_3SiO_{1/2}$ endblocking units; a dichlorophenylmethylsiloxane of 500 cs. viscosity at 25° C.; a chloromethylchlorophenylsiloxane polymer of 350 cs. viscosity at 25° C.; a methylethylsiloxane of 1000 cs. viscosity at 25° C.; copolymers of 85 mol percent dimethylsiloxane and 15 mol percent of any of chloronaphthylmethylsiloxane units, (bromophenylethyl)methylsiloxane units, perchlorocyclohexylmethylsiloxane units, vinylphenylsiloxane units, and tetrachlorophenylmethylsiloxane units, said copolymers having viscosities of 5,000 cs. at 25° C.

That which is claimed is:

1. A lubricating composition consisting essentially of an organopolysiloxane oil thickened to a grease consistency with a diurea compound of the general formula RNHCONHR′NHCONHR wherein each R is a cycloalkyl radical of up to 18 carbon atoms and each R′ is a divalent radical selected from the group consisting of aliphatic and aromatic hydrocarbon radicals and halogenated derivatives thereof.

2. The lubricating composition of claim 1 further characterized in that each R is a cycloalkyl radical of 4 to 12 carbon atoms.

3. The lubricating composition of claim 1 further characterized in that the organopolysiloxane oil is a polymeric fluid containing up to 15 mol percent units of the formula $R''SiO_{3/2}$, 1 to 20 mol percent of units of the formula $R''_3SiO_{1/2}$, the remaining units being of the formula $R''_2SiO$ where each $R''$ is a monovalent radical selected from the group consisting of hydrocarbon radicals and halogenated hydrocarbon radicals containing 1 to 18 carbon atoms.

4. The lubricating composition of claim 3 further characterized in that the organopolysiloxane oil contains at least 70 mol percent of diorganosiloxane units of the formula $R''_2SiO$ and has a viscosity in the range from 5 cs. to 10,000 cs. at 25° C.

5. The lubricating composition of claim 1 further characterized in that the diurea is present in proportion ranging from 10 to 50 percent by weight based on the weight of the composition.

6. The lubricating composition of claim 1 further characterized in that each R is a cyclohexyl radical.

7. A lubricating composition in accordance with claim 1 further characterized in that the diurea employed is selected from the group consisting of dicyclohexylamine-naphthylene diurea, dicyclohexylamine - tolylene - diurea, and dicyclohexylamine-diphenylmethane-4,4′diurea.

References Cited

UNITED STATES PATENTS

| | | | |
|---|---|---|---|
| 2,710,840 | 6/1955 | Swakon et al. | 252—51.5 |
| 2,993,044 | 7/1961 | Applegoth et al. | 252—51.5 |
| 3,242,210 | 3/1966 | Dreher et al. | 252—51.5 |

DANIEL E. WYMAN, *Primary Examiner.*

IRVING VAUGHN, *Assistant Examiner.*

U.S. Cl. X.R.

252—51.5